3,067,190
PROCESS FOR THE POLYMERIZATION OF ALIPHATIC OLEFINS
Walter Rottig, Hohenweg, Germany, assignor to Ruhrchemie Aktiengesellschaft, Oberhausen-Holten, Germany
No Drawing. Filed Jan. 12, 1960, Ser. No. 1,849
4 Claims. (Cl. 260—94.9)

This invention relates to a process for the polymerization of aliphatic olefins, especially ethylene, but also including propylene, n-butylene and other higher aliphatic olefins of the formula $$CH_2=\overset{H}{\underset{}{C}}-R$$

where R is an alkyl group.

It has now been discovered that the efficiency of such catalysts can be increased considerably. It has been found that the polymerization of aliphatic olefins, especially ethylene, at pressures between 1 and 100 kg./cm.$^2$ and at temperatures of 20 to 100° C., is catalyzed by the addition of lower valency compounds of heavy metals from the fourth to the sixth side group in the periodic system, especially if titanium, zirconium and vanadium are used, and by the addition to the olefin stream during the polymerization of 20 to 500 p.p.m. of carbon monoxide, preferentially of 30 to 250 p.p.m.

The practical application of this invention is closely related to the procedures which are used for the preparation of polyolefins with the so-called Ziegler and Natta catalysts. This invention uses as active components lower valency compounds of heavy metals, especially compounds of titanium, zirconium and vanadium. Such compounds are obtained for example by the reaction of the corresponding compounds of higher valency, especially of halogen compounds, with aluminum alkyls and/or halogenalkyls, especially with trialkyls. For example, highly active catalysts may be prepared by the reaction of tetravalent titanium compounds, especially titanium-halogen compounds such as TiCl$_4$, with aluminumalkyls and/or halogenalkyls, especially aluminumtrialkyls, e.g., aluminumtriethyl, aluminumtripropyl and/or aluminum alkyl halides e.g., diethyl aluminum chloride, dibutyl aluminum chloride, isobutyl aluminum dichloride etc.

The components are allowed to react with one another in a suitable medium which has preferably been extensively freed from oxygen and from oxygen containing compounds. Especially aliphatic, aromatic or naphthenic hydrocarbons or mixtures therefrom have proved to be practical. The reaction time depends on the type of structure of the compounds to be converted and may take from ten minutes to 48 hours. Generally 2 to 24 hours are required. The concentration of the reactants should be in the range of one to 500 g./liter and conveniently between 10 and 250 g./liter. The temperatures at which the reaction takes place should be kept between −50 and +100° C., advantageously between −25 and +50° C.

The molar ratio of the starting components is important but not critical. Equimolar proportions have given especially good results. However, it is also possible that the heavy metal component be employed in excess or in deficiency.

In order to obtain a highly active catalyst with reproducible properties at all times, it is of advantage to wash the formed heavy metal compound of lower valency repeatedly with suitable solvents. The already mentioned hydrocarbons have been successfully used. Also in this case they should be free of oxygen and of oxygen containing compounds.

In order to increase the efficiency or to change the directive force of the catalyst, which is made up of lower valency compounds of heavy metals, activators may be added. Aluminumorganic compounds are such activators, especially aluminumalkyls and/or halogenalkyls or aluminum alkylates, which are employed in ratios of 0.1 to 2.5 moles per mole of low valency compound of a heavy metal. However, also heavy metal compounds of higher valency may be used as activators. They should also be used in quantities of 0.1 to 2.5 moles per mole of low valency heavy metal compound.

The preparations of this invention are conveniently applied in form of suspensions. The concentration of the low valency heavy metal compound in this suspension may vary between wide limits and should be between 10 to 500 g./liter, preferably between 25 and 100 g./liter. Such suspensions may be stored over a long period of time. In this case purging with a protective gas such as dry and oxygen free nitrogen is a necessity. Such preparations are stable for several weeks and they lose practically none of their activity.

For the polymerization, the compound of low valency, e.g., the titanium or vanadium compound is applied in quantities ranging between 0.05 and 0.001 moles per liter of polymerization medium, conveniently between 0.005 and 0.025 moles/liter.

The added carbon monoxide should range between 20 and 500 p.p.m., preferably between 30 and 250 p.p.m., based on the olefin employed. The carbon monoxide should be as anhydrous as possible.

The carbon monoxide may be added to the ethylene stream before it enters the reactor, either continuously or in increments. It is also possible to add the carbon monoxide directly to the reactor, e.g., through a dip tube, either continuously or in increments. The mode of carbon monoxide application is independent of the mode of the polymerization process. Surprising results are obtained both by continuous and by discontinuous additions of the carbon monoxide.

The polymerization may be carried out at temperatures varying between room temperature and 100° C.; temperatures between 40 and 80° are especially good.

According to this invention the pressure should be between 1 and 100 atmospheres. It is also possible to work at pressures which are below 1 atmosphere.

In addition to the application of pure carbon monoxide it is also possible to add oxygen as an activator. The quantity of oxygen which should be employed is in the same order of magnitude as the employed carbon monoxide.

*Example 1*

In a reactor of 750 ml. volume 7.5 g. of titanium tetrachloride and 6 g. of triethylaluminum are allowed to react for about 24 hours at room temperature. The suspension medium is 500 ml. of hydrogenated and subsequently dried propylene trimer (p.p.m. value is 5 against isopropyl potassium).

After standing for 24 hours the brown precipitate which formed was filtered and rinsed 7 times with 250 ml. of propylene trimer. The residue was suspended in 250 ml. of propylene trimer and used in this form for the polymerization experiments.

A glass vessel having a volume of 5 liters, equipped with a highly efficient stirrer, a thermometer and a gas inlet and a gas outlet, respectively, and an inlet for the carbon monoxide, was charged with 1800 ml. of the above mentioned propylene trimer. It was heated to 70° C. and 1.2 g. of titanium trichloride was taken from the already mentioned suspension and added to the reactor. Over a period of 6 hours the reaction of 400 liters of ethylene was observed.

If 1 ml. of carbon monoxide was added every 15 minutes, beginning with the fifteenth minute, the ethylene conversion was increased to 505 liters within a period of 6 hours.

If the carbon monoxide was added to the ethylene stream in about the same quantity in the same intervals, about the same yield was obtained.

If 1 ml. portions of carbon monoxide were added at intervals of 7.5 minutes the conversion rose to 700 liters ethylene in 6 hours. By the addition of 1 ml. portions in 5 minute intervals, 650 liters of ethylene was converted.

If for the preparation of $TiCl_3$ triisobutylaluminum was substituted for triethylaluminum the observed conversions were about 90 to 95 percent under comparable reaction conditions.

*Example 2*

Analogous to Example 1, by application of titaniumtetrabromide a brown-black precipitate of titanium tribromide was obtained which was also employed in the form of a suspension.

If a stoichiometric amount of titanium tribromide (2.2 g.), corresponding to 1.2 g. of $TiCl_3$ is employed and 1 ml. of carbon monoxide is added at intervals of 7.5 minutes, the ethylene conversion was 720 liters in 6 hours. At this point the experiment was not terminated, rather the reaction mixture was allowed to react at room temperature over a period of an additional 38 hours while a slow stream of ethylene was swept through the reactor. Thus, an additional 473 liters of ethylene was absorbed. This corresponds to n average hourly absorption of 12 liters and a total absorption of 1200 liters.

Since the employed quantities of suspension medium seemed to be too low, another experiment was performed in which in place of 1800 ml., 2500 ml. of propylene trimer was employed. This procedure permitted the absorption of 820 liters of ethylene within a period of 6 hours. The further course of the ethylene absorption at room temperature under slow stirring corresponded to the already mentioned figures.

If in place of 1 ml. of carbon monoxide within 7.5 minutes the interval was shortened to 5 minutes or if the monoxide was added to the ethylene stream, the ethylene absorption in 5 hours was 720 liters.

When in a further experiment 1 ml. of carbon monoxide was added at intervals of 2.5 minutes the ethylene absorption after 6 hours was 700 liters and over the next 24 hours at room temperature the rate of ethylene absorption was 8 liters/hour.

These examples demonstrate the increased efficiency of the polymerization when carried out in the presence of the recited amounts of carbon monoxide. It is understood that they are illustrative only and that the other specific embodiments of the invention, as herein described, are within the spirit and scope of the following claims.

I claim:

1. A process for polymerizing ethylene comprising preparing a reaction medium consisting of (1) a hydrocarbon diluent which has been extensively freed of oxygen and oxygen-containing compounds and (2) an insoluble reaction product prepared by reacting in a hydrocarbon diluent medium a mixture consisting of (a) a titanium tetrahalide with (b) sufficient of a trialkyl aluminum to reduce the valency of at least a portion of said titanium and washing the resulting insoluble reaction product with a liquid hydrocarbon, components (a) and (b) being present in the range from 1 to 500 grams per liter of said hydrocarbon diluent medium during the preparation of said insoluble reaction product and the titanium content in said reaction medium during polymerization being between 0.05 and 0.001 gram atom per liter of said reaction medium, adding ethylene to said reaction medium, adding carbon monoxide to said reaction medium while said ethylene is polymerizing the added carbon monoxide being in the range between 30 and 250 p.p.m. based on said ethylene, and maintaining said reaction medium at a temperature between about 20° and 100° C. and under a pressure between 1 and 100 kg./cm.² in order to effect polymerization of the ethylene in said reaction medium.

2. The process of claim 1 wherein the mean ratio of component (a) to component (b) is about 1 to 1.

3. The process for polymerizing ethylene comprising preparing a reaction medium consisting of (1) a hydrocarbon diluent which has been extensively freed of oxygen and oxygen-containing compounds and (2) an insoluble reaction product prepared by reacting in a hydrocarbon diluent medium a mixture consisting of (a) about one mole of titanium tetrachloride with (b) about one mole of trialkyl aluminum and washing the resulting insoluble reaction product with a liquid hydrocarbon, the components (a) and (b) being present in the range from 1 to 500 grams per liter of said hydrocarbon diluent medium during the preparation of said insoluble reaction product and the titanium content in said reaction medium during polymerization being between 0.05 and 0.001 gram atom per liter of said reaction medium, adding ethylene to said reaction medium, adding carbon monoxide to said reaction medium while said ethylene is polymerizing, the added carbon monoxide being in the range between 30 and 250 p.p.m. based on said ethylene, and maintaining said reaction medium at a temperature between about 20° to 100° C. and under a pressure between 1 and 100 kg./cm.² in order to effect polymerization of said ethylene in said reaction medium.

4. The process for polymerizing ethylene comprising preparing a reaction medium consisting of (1) a hydrocarbon diluent which has been extensively freed of oxygen and oxygen-containing compounds and (2) an insoluble reaction product prepared by reacting in a hydrocarbon diluent medium a mixture consisting of (a) about one mole of titanium tetrabromide with (b) about one mole of triethyl aluminum and washing the resulting insoluble reaction product with a liquid hydrocarbon, the components (a) and (b) being present in the range from 1 to 500 grams per liter of said hydrocarbon diluent medium during the preparation of said insoluble reaction product and the titanium content in said reaction medium during polymerization being between 0.05 and 0.001 gram atom per liter of said reaction medium, adding ethylene to said reaction medium, adding carbon monoxide to said reaction medium while said ethylene is polymerizing, the added carbon monoxide being in the range between 30 and 250 p.p.m. based on said ethylene, and maintaining said reaction medium at a temperature between about 20° and 100 C. and under a pressure between 1 and 100 kg./cm.² in order to effect polymerization of said ethylene in said reaction medium.

References Cited in the file of this patent

UNITED STATES PATENTS

| | | |
|---|---|---|
| 2,892,826 | Peters et al. | June 30, 1959 |
| 2,893,984 | Seelbach et al. | July 7, 1959 |
| 2,905,645 | Anderson et al. | Sept. 22, 1959 |